US008879106B1

United States Patent
Robinson et al.

(10) Patent No.: US 8,879,106 B1
(45) Date of Patent: Nov. 4, 2014

(54) PROCESSING PRINT JOBS WITH MIXED PAGE ORIENTATIONS

(71) Applicant: Xerox Corporation, Norwalk, CT (US)

(72) Inventors: David C. Robinson, Penfield, NY (US); Karthikeyan Mahadevan, Hermitage, TN (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/955,050

(22) Filed: Jul. 31, 2013

(51) Int. Cl.
*G06F 3/12* (2006.01)

(52) U.S. Cl.
CPC .................................. *G06F 3/1237* (2013.01)
USPC ........................................................ 358/1.15

(58) Field of Classification Search
USPC ........................................................ 358/1.15
See application file for complete search history.

(56) References Cited

U.S. PATENT DOCUMENTS

| | | | |
|---|---|---|---|
| 6,020,970 A | 2/2000 | Erickson et al. | |
| 6,332,149 B1 | 12/2001 | Warmus et al. | |
| 7,177,045 B2 | 2/2007 | Goel et al. | |
| 7,911,637 B2 | 3/2011 | Kawamoto | |
| 8,373,875 B2 | 2/2013 | Ferlitsch et al. | |
| 8,437,576 B2 | 5/2013 | Efimov | |
| 2003/0167271 A1 | 9/2003 | Arnold et al. | |
| 2006/0001690 A1* | 1/2006 | Martinez et al. | 347/19 |
| 2009/0317000 A1 | 12/2009 | Efimov | |

\* cited by examiner

*Primary Examiner* — Qian Yang
(74) *Attorney, Agent, or Firm* — Gibb & Riley, LLC

(57) ABSTRACT

When at least one of the pages of a print job has a printing orientation setting and at least one of the pages of the print job lacks a printing orientation setting, methods and devices automatically apply user preferences to the pages of the print job that lack an orientation setting to produce a modified print job. When applying the user preferences, such methods and devices can set the printing orientation of the pages of the print job that lack an orientation setting to a most common printing orientation setting of other pages within the print job, if a "unified stack preference" is selected by the user. Alternatively, methods and devices can set the printing orientation of the pages of the print job that lack the orientation setting to an orientation associated with a highest processing speed if a "maximum throughput preference" is selected by the user.

24 Claims, 4 Drawing Sheets

PROCESSING PRINT JOBS WITH MIXED PAGE ORIENTATIONS

BACKGROUND

Systems and methods herein generally relate to processing print jobs and more particularly to processing print jobs that have mixed page orientations.

Print jobs may contain metadata that can provide instructions for variable rendering of the pages within the print job. The directions for how the metadata is to be used by print system raster image processors and finishing devices can be included within the print job file, or can be included within an accompanying file or distributed protocol. For example, the metadata can include recipient data such as location information, which could be specified by a protocol to be printed on different grades of media stock. Further, these systems can maintain a hierarchy that utilizes a catalog (a tree) that contains the metadata and is distributed among appropriate root, set, document and sub-document levels.

Many manufacturers provide specifications defining how the metadata (that drives media and finishing outcomes) needs to be written within the print job file. The finishing outcomes can determine, for example, the orientation of the printed media. Designations may result in an orientation known as a short edge feed (SEF) or a long edge feed (LEF). The short edge feed aligns the longest edge of the media parallel to the processing direction within the printing device, while the long edge feed aligns the shortest edge of the media parallel to the processing direction within the printing device. The long edge feed utilizes less room in the processing direction, which yields a faster throughput (optimal throughput within a printing device). In some examples, print jobs can utilize both short edge feed and long edge feed for different pages within a single print job.

SUMMARY

Exemplary methods herein receive a print job that includes pages to be printed and data (e.g., metadata driving medium and finishing outcomes) indicating the printing orientation of the pages of the print job. Such methods automatically determine whether any pages of the print job have a specified (or set) orientation based on such data, and automatically determine whether any of the pages of the print job lack a printing orientation setting (again, based on the data in the print job).

These methods also receive (before or after receiving the print job) user preferences for choosing an automated printing orientation for the pages of the print job that lack the orientation setting. Such user preferences can include, for example, a unified stack preference for outputting a stack of printed pages having the same orientation, and a maximum throughput preference for maximizing a processing speed of the print job through a printing device.

When at least one of the pages of the print job has a printing orientation setting in combination with at least one of the pages of the print job lacking a printing orientation setting, these methods automatically apply these user preferences to the pages of the print job that lack an orientation setting to produce a modified print job.

When applying the user preferences, such methods can set the printing orientation of the pages of the print job that lack an orientation setting to the most common printing orientation setting of other pages within the print job, if the "unified stack preference" is selected by the user. For example, these methods can set the printing orientation of all the pages of the print job to the most common printing orientation setting of the pages within the print job if the unified stack preference is selected by the user. Also, rather than being based on all the pages of the print job, this "most common" printing orientation setting can simply be based on the most common orientation of a range of adjacent pages of the print job (where the "range" of pages is less that all pages in the print job).

Alternatively, when applying the user preferences, these methods can set the printing orientation of the pages of the print job that lack the orientation setting to an orientation associated with the highest processing speed if the "maximum throughput preference" is selected by the user. In one extreme example, these methods can set the printing orientation of all the pages of the print job to the orientation associated with the highest processing speed. The orientation that is "associated with the highest processing speed" is the orientation that aligns the shortest side of printing medium parallel with the processing direction of the medium within the printing device.

These methods then print the modified print job. These user preferences can be maintained by an associated computerized or printing device, and these methods can apply the user preferences to print jobs in the future.

Various devices and systems herein include (among other components) a processor that receives a print job, a printing engine and a graphic user interface, both operatively (meaning directly or indirectly) connected to the processor. The print job again includes pages to be printed using the printing engine, and the print job includes data indicating a printing orientation of the pages of the print job.

The processor automatically determines whether any pages of the print job have a specified (or set) orientation based on the data. The processor also automatically determines whether any of the pages of the print job lack a printing orientation setting based on the data. The graphic user interface receives user preferences for choosing an automated printing orientation for the pages of the print job that lack the orientation setting. Again, these user preferences can include, for example, a unified stack preference for outputting a stack of printed pages having the same orientation, and a maximum throughput preference for maximizing the processing speed of the print job through the printing engine.

If at least one of the pages of the print job has a specified printing orientation and at least one of the pages of the print job lacks a printing orientation setting, the processor automatically applies the user preferences to the pages of the print job that lack an orientation setting to produce a modified print job. The printing engine prints the modified print job.

When automatically applying the user preferences, the processor sets the printing orientation of the pages of the print job that lack an orientation setting to the most common printing orientation setting of other pages within the print job if the unified stack preference is selected by the user; or sets the printing orientation of the pages of the print job that lack the orientation setting to an orientation associated with the highest processing speed if the maximum throughput preference is selected by the user.

The processor automatically applies the user preferences by, for example, setting the printing orientation of all the pages of the print job to the most common printing orientation setting of the pages within the print job, if the unified stack preference is selected by the user. Also, rather than being based on all the pages of the print job, this "most common" printing orientation setting can simply be based on the most common orientation of a range of adjacent pages of the print job (where the "range" of pages is less that all pages in the print job).

If the maximum throughput preference is selected by the user, rather than just setting the orientation of pages lacking an orientation setting, the processor can automatically apply the user preferences by setting the printing orientation of all the pages of the print job to the orientation associated with the highest processing speed, thereby resetting the orientation of all pages. Again, the orientation that is associated with the highest processing speed is the orientation where the shortest side of the printing medium is aligned parallel with the processing direction within the printing engine.

The processor can maintain the user preferences (in, for example, a non-transitory, tangible storage medium) for future use and apply the user preferences to future print jobs. These and other features are described in, or are apparent from the following detailed description.

BRIEF DESCRIPTION OF THE DRAWINGS

Various exemplary systems and methods are described in detail below, with reference to the attached drawing figures, in which.

DETAILED DESCRIPTION

Figure 1:
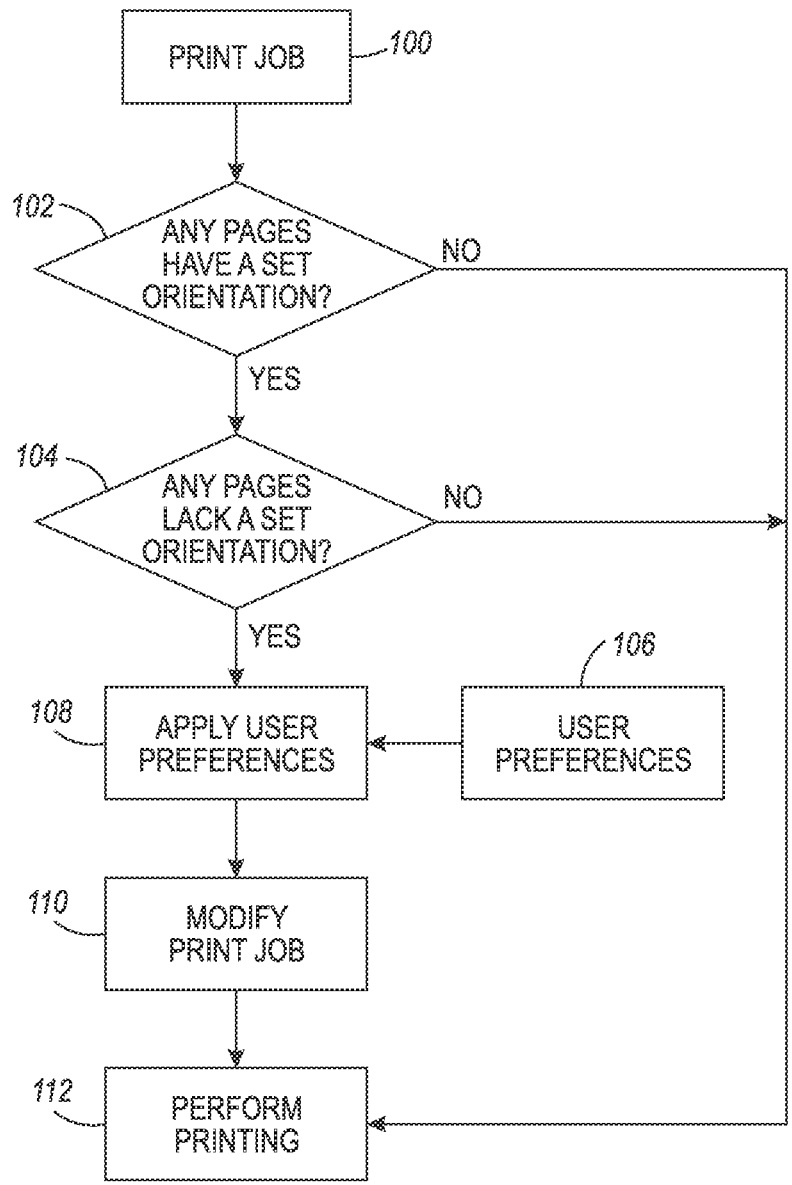
FIG. 1 is a flow diagram of various methods herein.

As mentioned above, long edge feed page orientation utilizes less room in the processing direction, which yields a faster throughput (optimal throughput within a printing device). In some examples, individual print jobs can utilize differently oriented sheets for different pages within the print job (where differently oriented sheets of media are drawn from different paper trays, or where continuous media is cut differently during the processing of the single print job). However, such print jobs may not designate an orientation for all pages within the print job. For pages within the print job that lack an orientation designation, there is no clear instruction within the print job of how such pages should be processed, which can cause such pages to not be processed in the most efficient manner and/or such pages may not be oriented according to the preferences of the user.

Therefore, the systems and methods herein obtain and utilize user page orientation preferences for the pages that lack an orientation designation. With devices and methods herein, the user indicates their preferences by selecting among various options, via graphic user interface or job ticket. For example, the user may be presented with options including "unified stack" and "maximum throughput."

Devices and methods herein scan the print job for media and finishing metadata, or other commands. These commands are compared to the print system's capabilities. If the comparison determines that multiple page orientations are included within the print job, the pages within the print job are oriented based on the user preferences.

Therefore, with devices and methods herein, before committing to frame buffer size for a print job, the print job is scanned for internal media, page orientation, and finishing commands. The commands are compared to the queue settings to determine if the commands take precedence on the job output. If the commands take precedence, the commands are compared to the capabilities of the printing device to determine the required print orientation of the pages within the print job.

Some print jobs may require that all pages utilize the short edge feed or the long edge feed, or print jobs may designate one of many orientations for every page within the print job. In these situations, the instructions of the print job are followed without modification, as there is no ambiguity regarding page orientation. Other print jobs may designate that all pages can be oriented in either direction, and for these print jobs, the long edge feed orientation can simply be utilized to provide maximum throughput.

However, for print jobs that designate one or more orientations for specific pages, yet do not designate specific orientations for all pages, the devices and methods herein utilize user preferences to ensure that the user will be satisfied with the trade-off between page orientation and printer throughput. Thus, the devices and methods herein provide optimal throughput or common output orientation based on a user preference for the handling of media and finishing commands.

In various alternatives, instead of determining print orientation via a majority of pages, the page orientation could be determined by the orientation of adjacent pages (potentially using a weighting function). In addition, the methods and devices herein can even override the page orientation required by the print job, if the user requires absolute maximum throughput or prohibits stack output with multiple orientations.

FIG. 1 is a flowchart illustrating exemplary methods herein. In item 100, these methods receive a single (individual) print job that includes pages to be printed and data (e.g., metadata driving medium and finishing outcomes) indicating the printing orientation of the pages of the print job. In item 102, such methods automatically determine whether any pages of the print job have a specified printing orientation (a printing orientation setting) based on such data and, in item 104, automatically determine whether any of the pages of the print job lack a printing orientation setting (again, based on the data in the print job). As shown in the flowchart, if either of these determinations is found to be in the negative (no pages having orientation settings and/or no pages lacking orientation settings), the original print job is printed without modification in item 112.

These methods also receive or retrieve (input before or after the print job) user preferences (shown in item 106) for choosing an automated printing orientation for the pages of the print job that lack the orientation setting. Such user preferences 106 can include, for example, a unified stack preference for outputting a stack of printed pages all having the same orientation, and a maximum throughput preference for maximizing a processing speed of the print job through a printing device.

When at least one of the pages of the single print job has a printing orientation setting 102 in combination with at least one of the pages of the print job lacking a printing orientation setting 104, processing flows to item 108 where these methods automatically apply these user preferences 106 to the pages of the print job that lack an orientation setting to produce a modified print job (shown as item 110). The modified print job is then printed, as shown in item 112.

When applying the user preferences in item 108, such methods can set the printing orientation of the pages of the print job that lack an orientation setting to the most common (e.g., most frequent) printing orientation setting of other pages within the print job, if the "unified stack preference" is selected by the user in item 106. For example, if a 200 page print job included 30 landscape oriented pages and 70 portrait oriented pages, all pages lacking an orientation setting are set to portrait orientation because portrait orientation is more common than landscape orientation in this print job. This minimizes the number of sheets that will diverge from the most common orientation (diverge from portrait orientation) in the final stack, thereby keeping more of a uniform output stack of sheets, and complying with the user's preference for as unified a stack as possible.

In another example, in item 108, these methods can set the printing orientation of all the pages of the print job to the most common printing orientation setting of the pages within the print job, if an absolute unified stack preference is presented to and selected by the user in item 106. Also, rather than being based on all the pages of the print job, this "most common" printing orientation setting can simply be based on the most common orientation of a range of adjacent pages of the print job (where the "range" of pages could be less than all pages in the print job). For example, the range could be a specific number of pages (e.g., surrounding 10 pages, preceding 10 pages, following 10 pages, etc.) or could be a percentage of the print job (e.g., surrounding 10% of the print job, preceding 10% of the print job, following 10% of the print job, etc.). Again, such items (such as most common in full print job, range in print job, range by page, range by percentage, etc.) are presented to the user, and input is received back from the user, using a graphic user interface in item 106.

Alternatively, when applying the user preferences in item 108, these methods can set the printing orientation of the pages of the print job that lack the orientation setting to an orientation associated with the highest processing speed if the "maximum throughput preference" is selected by the user in item 106. Therefore, if the long edge first orientation provides maximum throughput for a given printer, all pages lacking an orientation setting are set to long edge first to provide optimal throughput, while still allowing multiple orientation printing.

In another example, these methods can set the printing orientation of all the pages of the print job to the orientation associated with the highest processing speed, based on user preferences 106. Again, in examples herein, the orientation that is "associated with the highest processing speed" can be the orientation that aligns the shortest side of printing medium parallel with the processing direction of the medium within the printing device.

As additional examples, the devices and methods herein can present the user with many different orientation options for any pages within the print job that lack an orientation setting (using a graphic user interface in item 106). One such user orientation preference option that can be presented in item 106 is for absolute maximum throughput, irrespective of original orientation settings within the print job. Selection of this option resets the orientation setting of all pages within the print job to long edge feed (or other maximum throughput orientation).

Another user orientation preference option that can be presented in item 106 is to prevent any mixed orientations within the output stack. This option can include sub-options regarding whether portrait or landscape orientation is preferred, a preference to orient all sheets to match the most common orientation within the print job, or a preference to provide maximum throughput (long edge feed) if a sufficient percentage of the print job contains long edge feed orientation pages, etc.

An additional user orientation preference option that can be presented in item 106 is a preference to maintain the page orientation until a page is encountered within the print job that changes the orientation. This option provides that any page within the print job that lacks an orientation setting merely follows the orientation of the preceding page.

Further user orientation preference options that can be presented in item 106 include an option to prevent specific regions of the print job (e.g., the first or last 25% of the pages, etc.) from having different orientations (e.g., the most common orientation could be utilized in these regions); an option to present all pages lacking an orientation setting that contain mostly text in a specific portrait or landscape orientation; an option to present all pages lacking an orientation setting that contain mostly graphics in a specific portrait or landscape orientation; etc. While specific options have been mentioned in the foregoing examples, those ordinarily skilled in the art would understand that many other options are included within item 106 and the claims presented below are intended to include all such non-specified options.

These user preferences 106 can be maintained by an associated computerized or printing device, and these methods can apply the user preferences to more than one print job (e.g., the current print job, and print jobs in the future).

Figure 2:
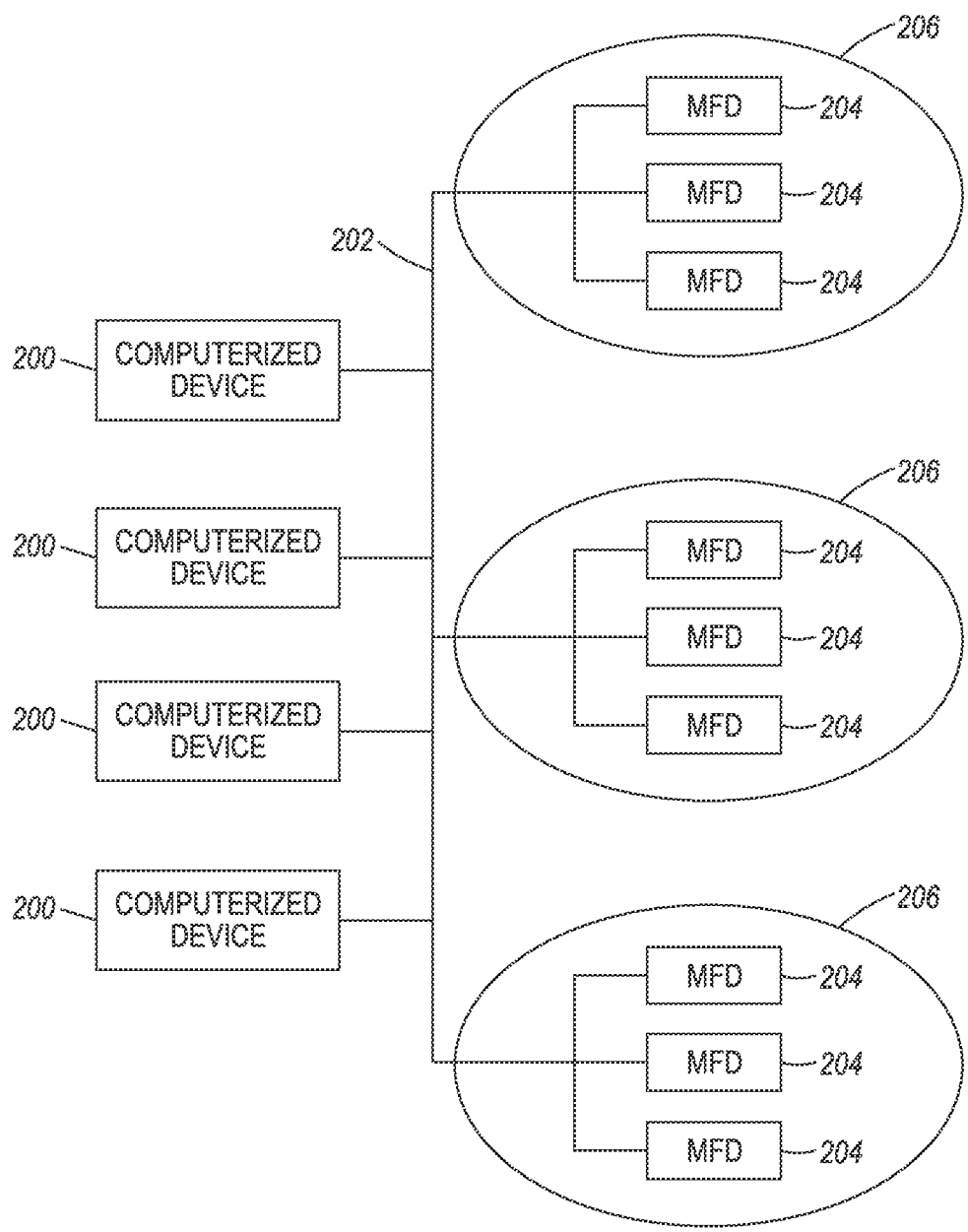
FIG. 2 is a schematic diagram illustrating systems herein.

As shown in FIG. 2, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
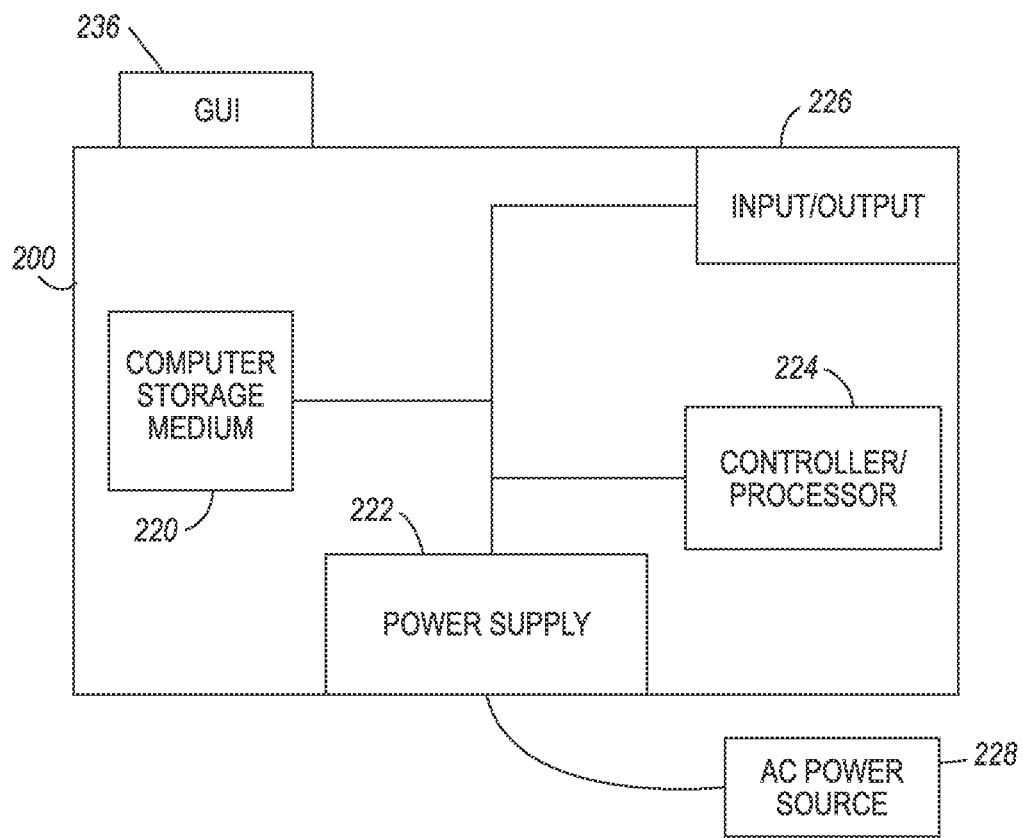
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236, that also operates on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 200 has one or more functional components that operate on power supplied from an alternating current (AC) source 228 by the power supply 222. The power supply 222 can comprise a power storage element (e.g., a battery, etc).

Figure 4:
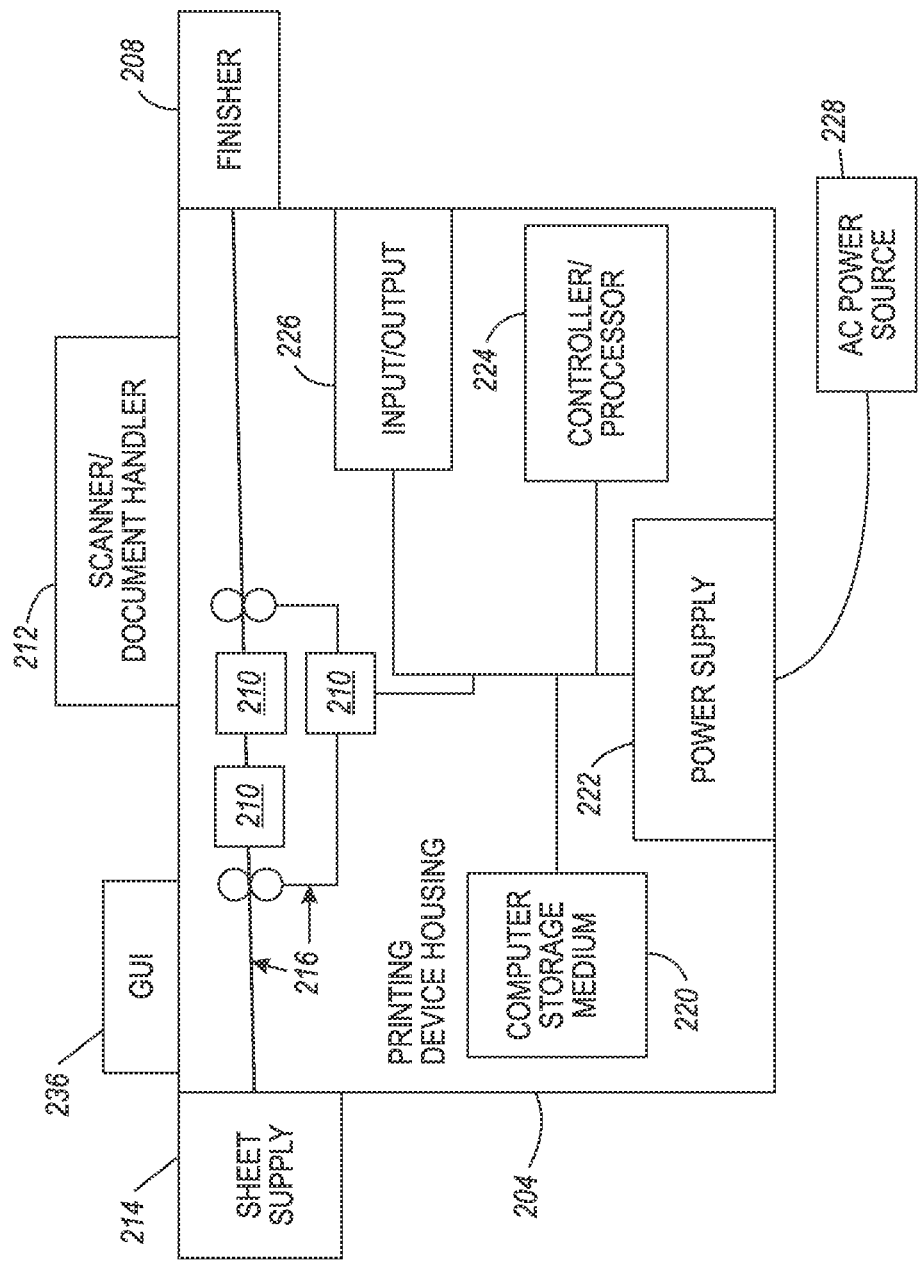
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a medium path 216 positioned to supply sheets of medium from a sheet supply 214 to the marking device(s) 210, etc. After receiving various markings from the printing engine(s), the sheets of medium can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, such devices and systems herein include (among many other components) a processor 224 that receives a print job, a printer/printing engine 204/210 and a graphic user interface 236, both operatively (meaning directly or indirectly) connected to the processor 224. The print job again includes pages to be printed using the printing engine 204/210, and the print job includes data indicating a printing orientation of the pages of the print job.

The processor 224 automatically determines whether any pages of the print job have a specified (or set) orientation based on the data. The processor 224 also automatically determines whether any of the pages of the print job lack a printing orientation setting based on the data. The graphic user interface 236 receives user preferences for choosing an automated printing orientation for the pages of the print job that lack the orientation setting. Again, these user preferences can include, for example, a unified stack preference for outputting a stack of printed pages having the same orientation, and a maximum throughput preference for maximizing the processing speed of the print job through the printing engine 204/210.

If at least one of the pages of the print job has a printing orientation setting and at least one of the pages of the print job lacks a printing orientation setting, the processor 224 automatically applies the user preferences to the pages of the print job that lack an orientation setting to produce a modified print job. The printing engine 204/210 prints the modified print job.

When automatically applying the user preferences, the processor 224 sets the printing orientation of the pages of the print job that lack an orientation setting to the most common printing orientation setting of other pages within the print job if the unified stack preference is selected by the user; or sets the printing orientation of the pages of the print job that lack the orientation setting to an orientation associated with the highest processing speed if the maximum throughput preference is selected by the user.

The processor 224 can automatically apply the user preferences by, for example, setting the printing orientation of all the pages of the print job to the most common printing orientation setting of the pages within the print job if the unified stack preference being selected by the user. Also, rather than being based on all the pages of the print job, this "most common" printing orientation setting can simply be based on the most common orientation of a range of adjacent pages of the print job (where the "range" of pages is less that all pages in the print job).

If the maximum throughput preference is selected by the user, rather than just setting the orientation of pages lacking an orientation setting, the processor 224 can automatically apply the user preferences by setting the printing orientation of all the pages of the print job to the orientation associated with the highest processing speed, thereby resetting the orientation of all pages. Again, the orientation that is associated with the highest processing speed can be the orientation where the shortest side of printing medium 220 is aligned parallel with the processing direction within the printing engine 204/210.

The processor 224 can maintain the user preferences (in, for example, a non-volatile, tangible storage medium 220) for future use and applying the user preferences to future print jobs.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
receiving a print job into a computerized device;
automatically determining whether any pages of said print job have a specified orientation using said computerized device;
automatically determining whether any of said pages of said print job lack a printing orientation setting using said computerized device;
presenting, to a user, options for choosing an automated printing orientation for said pages of said print job lacking an orientation setting using a graphic user interface operatively connected to said computerized device, and receiving, in response to said options, user preferences for choosing said automated printing orientation for said pages of said print job lacking an orientation setting using said graphic user interface, said options comprising:
a unified stack preference for outputting a stack of printed pages having the same orientation; and
a maximum throughput preference for maximizing a processing speed of said print job through a printing device;
automatically applying said user preferences to said pages of said print job lacking an orientation setting to produce a modified print job based on at least one page of said print job having said specified orientation, and based on at least one of said pages of said print job lacking said printing orientation setting, using said computerized device; and
printing said modified print job using a printing device operatively connected to said computerized device,
said automatically applying said user preferences comprising:
setting a printing orientation of said pages of said print job lacking an orientation setting to a most common printing orientation setting of other pages within said print job based on said unified stack preference being selected by said user; and
setting said printing orientation of said pages of said print job lacking an orientation setting to an orientation associated with a highest processing speed based on said maximum throughput preference being selected by said user.

2. The method according to claim 1, said automatically applying said user preferences comprising setting a printing orientation of all said pages of said print job to a most common printing orientation setting of said pages within said print job based on said unified stack preference being selected by said user.

3. The method according to claim 1, said automatically applying said user preferences comprising setting a printing orientation of all said pages of said print job to said orientation associated with said highest processing speed.

4. The method according to claim 1, said orientation associated with said highest processing speed comprising an orientation having a shortest side of printing medium being aligned parallel with a processing direction within said printing device.

5. The method according to claim 1, said most common printing orientation setting of other pages within said print job being based on a most common orientation of a range of adjacent pages of said print job, said range of pages being less that all pages in said print job.

6. The method according to claim 1, said user preferences being maintained by said computerized device, said method further comprising applying said user preferences to more than one print job.

7. A method comprising:
receiving a print job into a computerized device, said print job comprising pages to be printed using a printing device operatively connected to said computerized device, and said print job comprising data indicating a printing orientation of said pages of said print job;
automatically determining whether any pages of said print job have a specified orientation based on said data using said computerized device;
automatically determining whether any of said pages of said print job lack a printing orientation setting based on said data using said computerized device;
presenting, to a user, options for choosing an automated printing orientation for said pages of said print job lacking an orientation setting using a graphic user interface operatively connected to said computerized device, and receiving, in response to said options, user preferences for choosing said automated printing orientation for said pages of said print job lacking an orientation setting using said graphic user interface, said options comprising:
a unified stack preference for outputting a stack of printed pages having the same orientation; and
a maximum throughput preference for maximizing a processing speed of said print job through a printing device;
automatically applying said user preferences to said pages of said print job lacking an orientation setting to produce a modified print job based on at least one page of said print job having said specified orientation in combination with at least one of said pages of said print job lacking said printing orientation setting, using said computerized device; and
printing said modified print job using said printing device, said automatically applying said user preferences comprising:
setting a printing orientation of said pages of said print job lacking an orientation setting to a most common printing orientation setting of other pages within said print job based on said unified stack preference being selected by said user; and
setting said printing orientation of said pages of said print job lacking an orientation setting to an orientation associated with a highest processing speed based on said maximum throughput preference being selected by said user.

8. The method according to claim 7, said automatically applying said user preferences comprising setting a printing orientation of all said pages of said print job to a most common printing orientation setting of said pages within said print job based on said unified stack preference being selected by said user.

9. The method according to claim 7, said automatically applying said user preferences comprising setting a printing orientation of all said pages of said print job to said orientation associated with said highest processing speed.

10. The method according to claim 7, said orientation associated with said highest processing speed comprising an orientation having a shortest side of printing medium being aligned parallel with a processing direction within said printing device.

11. The method according to claim 7, said most common printing orientation setting of other pages within said print job being based on a most common orientation of a range of adjacent pages of said print job, said range of pages being less that all pages in said print job.

12. The method according to claim 7, said user preferences being maintained by said computerized device, said method further comprising applying said user preferences to more than one print job.

13. A device comprising:
a processor receiving a print job;
a printing engine operatively connected to said processor; and
a graphic user interface operatively connected to said processor,
said processor automatically determining whether any pages of said print job have a specified orientation,
said processor automatically determining whether any of said pages of said print job lack a printing orientation setting,
said graphic user interface presenting, to a user, options for choosing an automated printing orientation for said pages of said print job lacking an orientation setting and receiving, in response to said options, user preferences for choosing said automated printing orientation for said pages of said print job lacking an orientation setting,
said options comprising:
a unified stack preference for outputting a stack of printed pages having the same orientation; and
a maximum throughput preference for maximizing a processing speed of said print job through said printing engine,
said processor automatically applying said user preferences to said pages of said print job lacking an orientation setting to produce a modified print job based on at least one page of said print job having said specified orientation and based on at least one of said pages of said print job lacking said printing orientation setting,
said printing engine printing said modified print job,
said processor automatically applying said user preferences by:
setting a printing orientation of said pages of said print job lacking an orientation setting to a most common printing orientation setting of other pages within said print job based on said unified stack preference being selected by said user; and setting said printing orientation of said pages of said print job lacking an orientation setting to an orientation associated with a highest processing speed based on said maximum throughput preference being selected by said user.

14. The device according to claim 13, said processor automatically applying said user preferences by setting a printing orientation of all said pages of said print job to a most common printing orientation setting of said pages within said print job based on said unified stack preference being selected by said user.

15. The device according to claim 13, said processor automatically applying said user preferences by setting a printing orientation of all said pages of said print job to said orientation associated with said highest processing speed.

16. The device according to claim 13, said orientation associated with said highest processing speed comprising an orientation having a shortest side of printing medium being aligned parallel with a processing direction within said printing engine.

17. The device according to claim 13, said most common printing orientation setting of other pages within said print job being based on a most common orientation of a range of adjacent pages of said print job, said range of pages being less that all pages in said print job.

18. The device according to claim 13, said processor maintaining said user preferences and applying said user preferences to more than one print job.

19. A device comprising:
a processor receiving a print job;
a printing engine operatively connected to said processor, said print job comprising pages to be printed using said printing engine, and said print job comprising data indicating a printing orientation of said pages of said print job; and
a graphic user interface operatively connected to said processor,
said processor automatically determining whether any pages of said print job have a specified orientation,
said processor automatically determining whether any of said pages of said print job lack a printing orientation setting based on said data,
said graphic user interface presenting, to a user, options for choosing an automated printing orientation for said pages of said print job lacking an orientation setting and receiving, in response to said options, user preferences for choosing said automated printing orientation for said pages of said print job lacking an orientation setting,
said options comprising:
a unified stack preference for outputting a stack of printed pages having the same orientation; and
a maximum throughput preference for maximizing a processing speed of said print job through said printing engine,
said processor automatically applying said user preferences to said pages of said print job lacking an orientation setting to produce a modified print job based on at least one page of said print job having said specified orientation in combination with at least one of said pages of said print job lacking said printing orientation setting,
said printing engine printing said modified print job,
said processor automatically applying said user preferences by:
setting a printing orientation of said pages of said print job lacking an orientation setting to a most common printing orientation setting of other pages within said print job based on said unified stack preference being selected by said user; and
setting said printing orientation of said pages of said print job lacking an orientation setting to an orientation associated with a highest processing speed based on said maximum throughput preference being selected by said user.

20. The device according to claim 19, said processor automatically applying said user preferences by setting a printing orientation of all said pages of said print job to a most common printing orientation setting of said pages within said print job based on said unified stack preference being selected by said user.

21. The device according to claim 19, said processor automatically applying said user preferences by setting a printing orientation of all said pages of said print job to said orientation associated with said highest processing speed.

22. The device according to claim 19, said orientation associated with said highest processing speed comprising an orientation having a shortest side of printing medium being aligned parallel with a processing direction within said printing engine.

23. The device according to claim 19, said most common printing orientation setting of other pages within said print job being based on a most common orientation of a range of adjacent pages of said print job, said range of pages being less that all pages in said print job.

24. The device according to claim 19, said processor maintaining said user preferences and applying said user preferences to more than one print job.

* * * * *